Dec. 24, 1968  J. E. HESSE ET AL  3,418,409
METHOD FOR THICKENING THE END OF PLASTIC PIPE
Filed Oct. 15, 1965  2 Sheets-Sheet 1
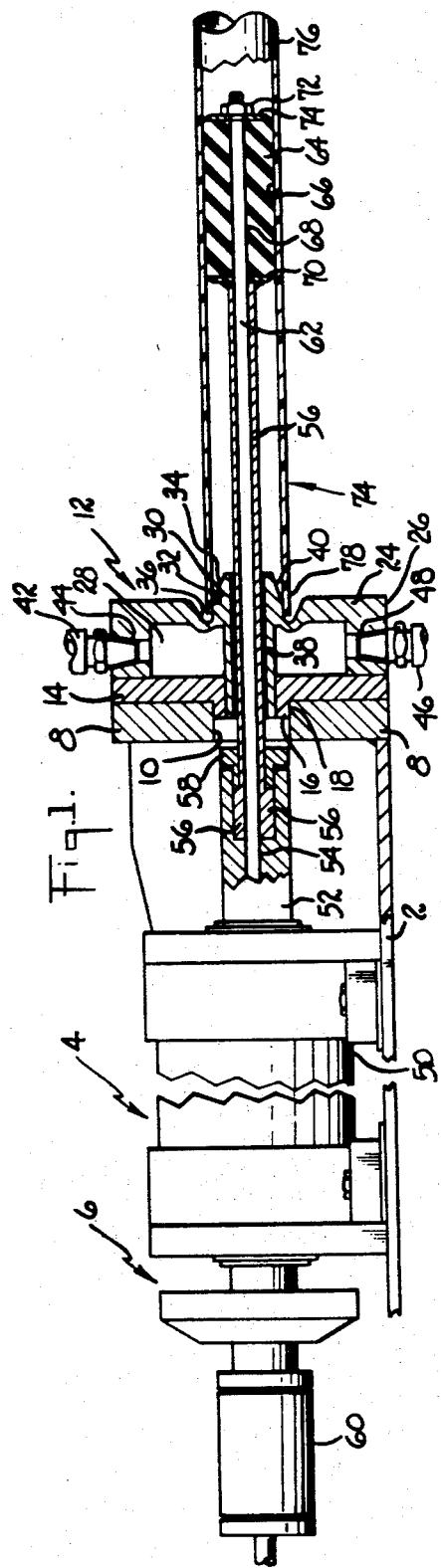
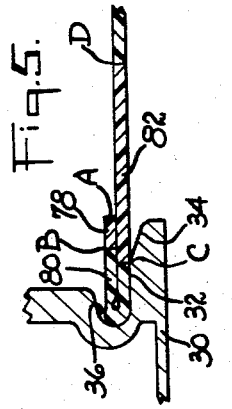
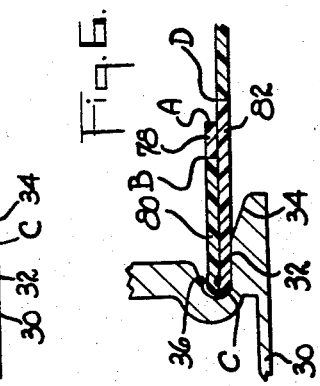
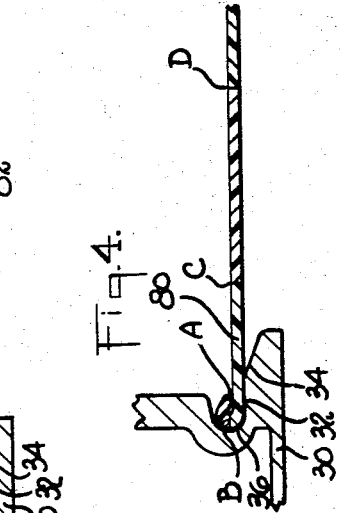
INVENTORS
JACK ELWYN HESSE
JOHN OSTAPOVICH
BY
John A. McKinney
ATTORNEY INVENTORS
JACK ELWYN HESSE
JOHN OSTAPOVICH
BY
John A. McKinney
ATTORNEY

United States Patent Office 3,418,409
Patented Dec. 24, 1968

3,418,409
METHOD FOR THICKENING THE END OF PLASTIC PIPE
Jack Elwyn Hesse, St. Augustine, Fla., and John Ostapovich, East Brunswick, N.J., assignors to Johns-Manville Corporation, New York, N.Y., a corporation of New York
Filed Oct. 15, 1965, Ser. No. 496,327
2 Claims. (Cl. 264—230)

ABSTRACT OF THE DISCLOSURE

A method for making a thickened end portion on an elastic memory plastic pipe by heating the end portion of the pipe and turning it back upon itself. Shrinkage of the folded section applies compressive forces on the remaining section of the pipe.

---

This invention relates to plastic pipe and more particularly to the forming of a thickened end portion on plastic pipe so that the thickened end portion may be expanded to form a bell end on the plastic pipe. The invention is particularly directed to the forming of a thickened end portion on poly(vinyl chloride) pipe but may also be used to form a thickened end portion on other types of plastic pipe such as polyethylene, nylon, polystyrene, acrylonitrile butadiene styrene, and other types of resinous materials that are capable of providing the desired physical and chemical characteristics.

The joining of adjacent sections of plastic pipe, whether by a rubber ring joint or solvent weld joint, is most advantageously accomplished by providing a pipe having one end belled. The bell end of the pipe preferably has a wall thickness which is at least substantially equal to the wall thickness of the remaining portions of the pipe. The most conventional way of forming the bell end on a pipe is to expand the end portion of the pipe which expansion also reduces the wall thickness of the expanded portion. Therefore, to allow for such reduction in wall thickness, it is necessary to provide a pipe with an end portion having a wall of sufficient thickness so that the wall thickness of the finished bell end will be at least as great as the wall thickness of the other portions of the pipe.

The primary object of the invention is to convert a plastic pipe having a substantially uniform wall thickness throughout its axial extent into a plastic pipe having an end portion of increased wall thickness which may be readily expanded to form a bell end.

The foregoing object is accomplished in accordance with the instant invention by folding a first section of the end portion of a plastic pipe of uniform wall thickness back upon the next succeeding sections of the end portion so as to form a plastic pipe having an end portion of increased wall thickness. To accomplish this result, it is necessary that the material in the end portion of the pipe have sufficient plasticity to allow the end portion to be folded back upon itself. The required plasticity may be obtained by heating the pipe to a temperature substantially greater than ambient. In the preferred embodiment of the invention, it is most desirable for the material in the pipe to have an elastic memory, that is, the material while at elevated temperature has the tendency to return to its original configuration. As explained below, the presence of these conditions in the end portion allows the end portion to be folded back upon itself so as to provide a plastic pipe having an end portion of increased wall thickness. The end portion is then placed in a suitable apparatus and expanded so as to form a bell end on the pipe.

The invention will be more fully understood and further objects and advantages thereof will become apparent when reference is made to the following detailed description of a preferred embodiment of the invention and the accompanying drawings in which:

FIG. 1 is a view in side elevation with parts in section of a portion of the apparatus of the instant invention;

FIGS. 3–6, inclusive, are views schematically illustrating various stages during the formation of a thickened end portion on a plastic pipe.

Figure 2:
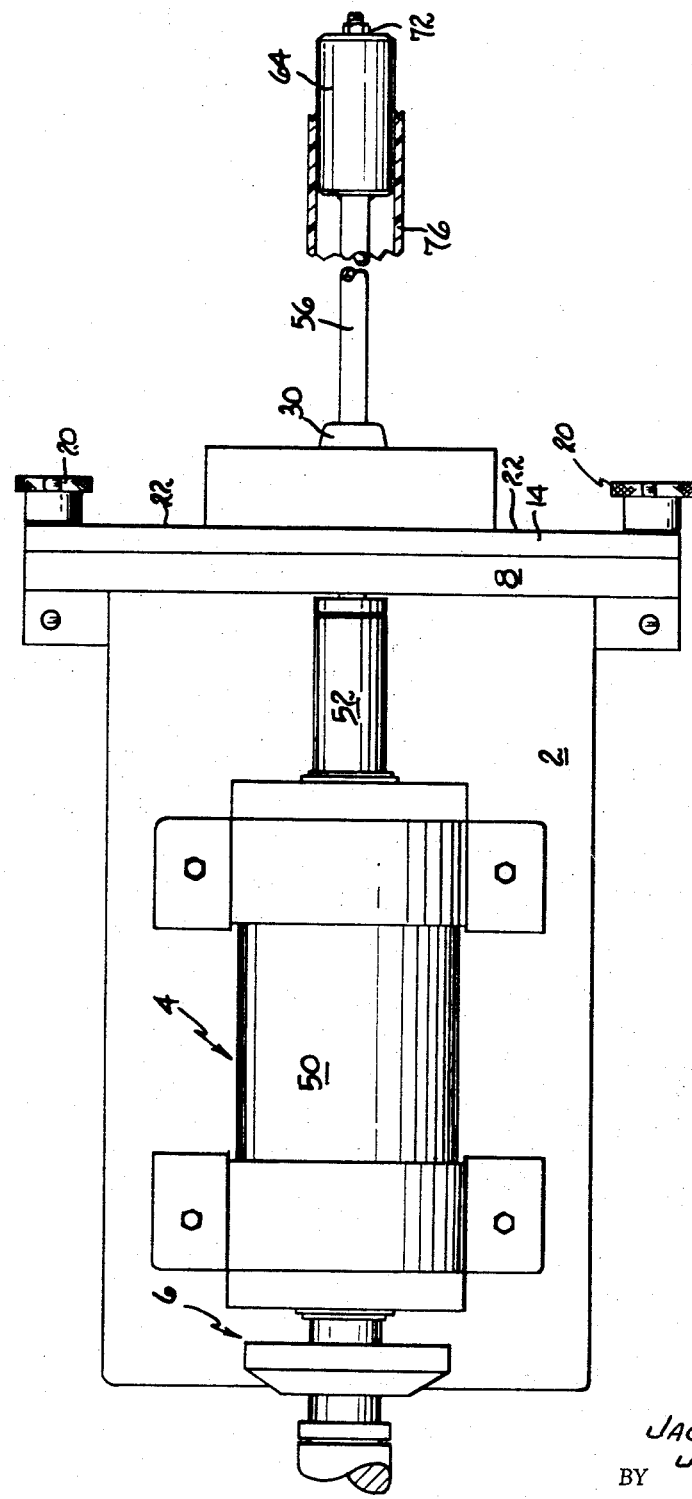
FIG. 2 is a top plan view of a portion of the apparatus illustrated in FIG. 1.

Referring to the drawings, there is disclosed in FIGS. 1 and 2 apparatus comprising a fixed base 2 on which the hydraulic means 4 and 6 are mounted. Securely attached on one side of the base 2, such as by welding, is a plate 8 having an opening 10 which is utilized for the positioning of the desired die in the apparatus. Each die 12 comprises a plate 14 having a protrusion 16 with an outer surface 18 having a shape corresponding to the shape of the opening 10 so that the die 12 may be properly positioned relative to the plate 8. The plates 8 and 14 have mating surfaces which are held in contracting relationship by a pair of pivotal stud and nut assemblies 20. Secured to the surface 22 of the plate 14 is the main portion of the die 12 comprising a die face 24 and four integral side walls 26 which are secured to the plate 14 to form a fluid tight cavity 28.

The die face 24 has a central projection 30 having a generally cylindrical surface 32 and a generally conical surface 34. The projection 30 extends from an annular recess 36 in the face 24. The surfaces of the projection 30 and the recess 36 cooperate to turn the first section and the next succeeding sections of the end portion of a plastic pipe back upon themselves so as to form a thickened end portion on the plastic pipe in a manner set forth below. The projection 30 is further provided with an integral generally cylindrical section 38 which extends toward the plate 14 and is secured in a fluid tight manner within the protrusions 16 of the plate 14. The projection 30 and the section 38 have a generally cylindrical passageway 40 extending therethrough for a purpose to be described. A conduit 42 is seated in an opening 44 in one of the side walls 26, and another conduit 46 is seated in an opening 48 in another of the side walls 26. Conduits 42 and 46 are provided for supplying and removing fluid to the cavity 28 to control the temperature of the surfaces of the die 12.

The hydraulic means 4 comprises a cylinder 50 and extending therefrom a piston 52. The hydraulic means 4 is positioned on the base 2 so that the piston 52 is aligned with the opening 18 and the passageway 40. The piston 52 has a generally cylindrical passageway 54 extending therethrough. An extension member 56 is seated in a recess adjacent the axial extremity of the piston 52 and is secured therein for movement with the piston 52 by any suitable means such as a stop nut 58. The member 56 comprises a hollow tube having a generally cylindrical surface and extends from the piston 52 through the passageway 40 of the section 38 and the projection 30 and outwardly from the axial extremity of the projection 30. The hydraulic means 6 comprises a cylinder 60 and a piston 62 which passes through the passageway 54 in the piston 52, through the hollow extension member 56, and extends outwardly from the axial extremity of the extension member 56. A body 64 having a generally cylindrical outer peripheral surface 66 and a generally cylindrical axial passageway 68 extending therethrough is positioned between the axial extremity of the member 56 and the axial extremity of the piston 62 with the piston 62 passing through the axial passageway 68. A pair of washers 70 and 71 and a nut 72 which is threaded onto the end of the piston 62 holds the body 64 in an assembled position on the piston 62. The body 64 comprises an elastic material for a purpose to be described below.

In operation, a die 12 having a projection 30 of the desired size is secured to the plate 8 by the pivoted stud and nut assemblies 20. The end portion 74 of a plastic pipe 72 is placed over the body 64 with the inner surface of the first section 78 of the end portion 74 of the pipe in contact with the generally cylindrical surface 32 of the projection 30. While the member 56 is held stationary, the piston 62 is moved in an axial direction so as to move the nut 72 and washer 71 toward the stationary washer 70. This movement supplies a force to the body 64 to deform the body in such a manner so as to decrease its axial length and increase its circumferential extent so that the peripheral surface 66 of the body 64 is in tight frictional engagement with the inner surface of the plastic pipe 76. Prior to the positioning of the pipe, the temperatures of the surfaces of the dies, particularly those adapted to contact the surface of the plastic pipe 76, have been raised to the desired temperatures by the movement of heated oil through the conduit 42 into the cavity 28 and out of the cavity 28 through the conduit 46. The flow of oil through the conduits 42 and 46 is controlled so as to maintain the surfaces of the die at the desired temperature.

FIGS. 3–6, inclusive, illustrate schematically a portion of the plastic pipe 76 as it moves through various stages during the formation of a thickened end portion thereon. In FIG. 3, the initial position of the various elements is illustrated with the inner surface of the first section 78, between the lines A–B, of the end portion 74 in contact with the generally cylindrical surface 32 of the projection 30. The first section 78 is held in this relationship against the heated surface 32 until it has been raised to the desired temperature. The length of time the first section 28 is held in this relationship depends upon many variables such as the radial wall thickness of the pipe, the type of material in the pipe, and the temperature of the die and particularly that of the surface 32. After the first section 78 has reached the desired temperature, the hydraulic means 4 is actuated and the piston 52 through the extension member 56 moves the body 64 toward the die 12. Since the body 64 is firmly gripping the inner surface of the pipe 76, the first section 78 is moved over the surface 32 of the projection 30 and the surfaces of the recess 36. The first section 78 follows the contours of these surfaces, and as illustrated in FIG. 4 is turned back upon the next succeeding section 80, between the lines B–C, of the end portion 74. In the preferred embodiment of the invention, the plastic pipe 76 is formed from a material that has an elastic memory when at an elevated temperature, that is, the material has a tendency when at an elevated temperature to return to its original dimensions after it has been deformed by the application of a force and after such force is no longer being applied. Therefore, once the first section has been turned and is no longer controlled by the surfaces of the recess 36, it has a tendency to shrink back to its original shape. This causes the inner surface of the first section 78, after this section has been turned, to move substantially into contact with the outer surface of a portion of the next succeeding section 80 of the end portion 74, as illustrated in FIG. 4. As the next succeeding section 80 of the end portion 74 moves over the surface 32 of the projection 30 and the surface of the recess 36, it will be raised in temperature so that the successive increments thereof will follow the contours of the surfaces of the projections 30 and the recess 36 and be turned back upon a portion of themselves and the remaining section 82, between the lines C–D, of the end portion 74, as illustrated in FIGS. 5 and 6. In the preferred embodiment of the invention, the rate of movement of the next succeeding section 80 over the surface of the projection 30 and the recess 36 is such that the successive increments of the next succeeding section 80 are raised to a temperature less than the temperature to which the first section 78 was raised. However, the temperature of the next succeeding section 80 is great enough so that this section also has an elastic memory so that as it is progressively turned it moves snugly into contact with the outer surface of the remaining section 82. As illustrated in FIG. 6, the movement of the pipe 76 is continued until the axial extremity of the turned first section 78 and the end of the remaining section 82, as illustrated by the line D are closely adjacent each other.

In one embodiment of the invention, a thickened end portion was made on a plastic pipe 76 comprising a poly(vinyl chloride) material. The pipe had an inside diameter of 1.25 inches and a radial wall thickness of 0.060 inch. The first section 78 and the next succeeding section 80 were folded back so that the axial extent of the thickened end portion was 1.687 inches. The generally cylindrical surface 32 of the projection 30 had an axial extent of 0.306 inch and the radius of curvature of the surfaces of the recess 36 adjacent the surface 32 was approximately 0.102 inch. Heated oil was passed through the cavity 28 so as to raise the temperature of the generally cylindrical surface 32 and the surface of the recess 36 to approximately 250°. The pipe 72 was positioned with the inner surface of the first section 78 in contact with the generally cylindrical surface 32 of the projection 30 for approximately 60 seconds. The hydraulic means 4 was then actuated so as to move the edge A of the first section 78 from the position illustrated in FIG. 3 to the position illustrated in FIG. 6 in approximately 110 seconds. After the thickened end portion has been formed, the pipe is removed from the apparatus of the instant invention, and the thickened end portion is then placed in suitable apparatus so as to form a bell end thereon.

As explained above, the material in the end portion of the plastic pipe when at an elevated temperature has an elastic memory. Thus, when the first section and the next succeeding sections have been folded back, they have a definite tendency to shrink back to their original diametral dimensions. This tendency brings the inner surfaces of the folded first section and next succeeding section into a contacting relationship with the outer surface of the remaining section. Also, this elastic memory is such that the folded first section and next succeeding section exert compressive forces on the remaining section of the end portion of the pipe. The exertion of these compressive forces functions to join the folded first section and next succeeding section with the remaining section in the formed thickened end portion of the plastic pipe.

While the invention has been described in rather full detail, it will be understood that these details need not be strictly adhered to and that various changes and modifications may suggest themselves to one skilled in the art, all falling within the scope of the invention as defined by the subjoined claims.

What we claim is:

1. A method for forming an end portion of increased wall thickness on a plastic pipe comprising:
    (a) providing an elastic memory plastic pipe having a substantially uniform wall thickness throughout its axial extent,
    (b) positioning the axial extremity of one end portion of said plastic pipe in a die having a surface contour adapted to fold said axial extremity, a first section of said end portion of said pipe, and the next succeeding section of said end portion back upon themselves,
    (c) raising the temperature of said first section of said end portion of said plastic pipe to a temperature substantially greater than ambient,
    (d) applying a force moving said pipe toward said die so that said first section and said next succeeding section of said end portion follow said contour of said die and turn back upon themselves, (e) heating said next succeeding section of the end portion of said plastic pipe to a temperature less than the temperature to which said first section was heated while applying said forces to said pipe, (f) contacting by shrinkage the outer surface of at least some of the unturned sections of said next succeeding section with the inner surface of the turned first section during said movement of said pipe, and (g) continuing said movement until a thickened end portion of a predetermined axial extent has been formed.

2. A method for forming an end portion of increased wall thickness on a plastic pipe comprising:

(a) providing an elastic memory plastic pipe having a substantially uniform wall thickness throughout its axial extent, (b) positioning the axial extremity of one end portion of said plastic pipe in a die having a surface contour adapted to fold said axial extremity, a first section of said end portion of said pipe, and the next succeeding section of said end portion back upon themselves, (c) heating said die so that the surfaces thereof contacted by said end portion of said pipe are at a temperature substantially greater than ambient, (d) holding said first section against a surface of said die until said first section has reached a temperature substantially greater than ambient, (e) applying a force moving said pipe toward said die so that said first section and said next succeeding section of said end portion follow said contour of said die and turn back upon themselves, (f) contacting by shrinkage the outer surface of at least some of the unturned sections of said next succeeding section with the inner surface of the turned first section during said movement of said pipe, and (g) continuing said movement until a thickened end portion of a predetermined axial extent has been formed.

References Cited

UNITED STATES PATENTS

| | | | |
|---|---|---|---|
| 2,361,933 | 11/1944 | Ferla | 25—30 |
| 2,485,885 | 10/1949 | Hoopes | 222—107 |
| 2,876,496 | 3/1959 | Murphy | 18—56 |
| 2,936,491 | 5/1960 | Hamlin | 264—230 X |
| 3,013,310 | 12/1961 | Foster | 264—323 X |
| 3,059,810 | 10/1962 | Edwards | 264—294 X |

FOREIGN PATENTS

| | | |
|---|---|---|
| 897,778 | 3/1945 | France. |
| 1,289,844 | 2/1962 | France. |
| 639,997 | 7/1950 | Great Britain. |
| 986,076 | 3/1965 | Great Britain. |

ROBERT F. WHITE, *Primary Examiner.*

R. R. KUCIA, *Assistant Examiner.*

U.S. Cl. X.R.

264—296, 322